United States Patent [19]

Kay

[11] 4,126,014
[45] Nov. 21, 1978

[54] SOLAR COLLECTOR PANEL AND REFRIGERATION SYSTEM OPERATED THEREBY

[76] Inventor: Thomas Kay, 6 Creek Rd., Great Neck, N.Y. 11023

[21] Appl. No.: 795,000

[22] Filed: May 9, 1977

[51] Int. Cl.$^2$ .................. F25B 27/00; F25B 15/00; F24J 3/02
[52] U.S. Cl. ........................... 62/2; 62/148; 62/476; 126/270
[58] Field of Search ............... 62/2, 141, 148, 476; 126/270, 271

[56] References Cited

U.S. PATENT DOCUMENTS

| 201,439 | 3/1878 | Moreau | 126/270 |
|---|---|---|---|
| 2,473,730 | 6/1949 | Saye | 62/141 |
| 2,484,669 | 10/1949 | Backstrom | 62/141 |
| 2,490,659 | 12/1949 | Snyder | 126/271 |
| 3,780,262 | 12/1973 | Rudd | 126/270 |
| 4,019,494 | 4/1977 | Safdari | 126/270 |
| 4,033,324 | 7/1977 | Eckels | 126/270 |
| 4,046,133 | 9/1977 | Cook | 126/270 |
| 4,062,346 | 12/1977 | Rapp, Jr. et al. | 126/270 |
| 4,078,544 | 3/1978 | Hollands et al. | 126/270 |

FOREIGN PATENT DOCUMENTS

1,263,393  5/1961  France .................................. 62/2

Primary Examiner—Lloyd L. King
Attorney, Agent, or Firm—Hans Berman

[57] ABSTRACT

Solar energy is collected by a plate-shaped panel of pliable plastic construction. The two major walls of the panel whose edges are sealed to each other consist of transparent and black plastic respectively and bound a cavity. The panel is expanded by air introduced by a blower and discharged through a restricted outlet. A radiation trap of pleated, transparent plastic sheeting is fastened in the cavity to the transparent wall. The hot air discharged from the panel when it collects solar radiation provides all the necessary energy for operating an absorption refrigeration system of the Electrolux type.

9 Claims, 4 Drawing Figures

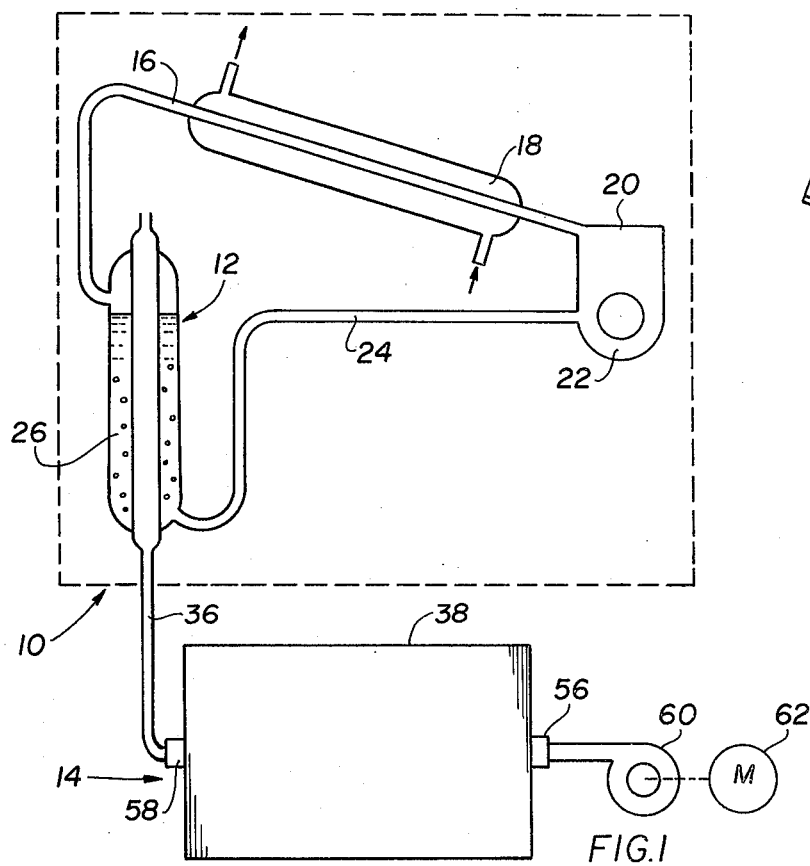
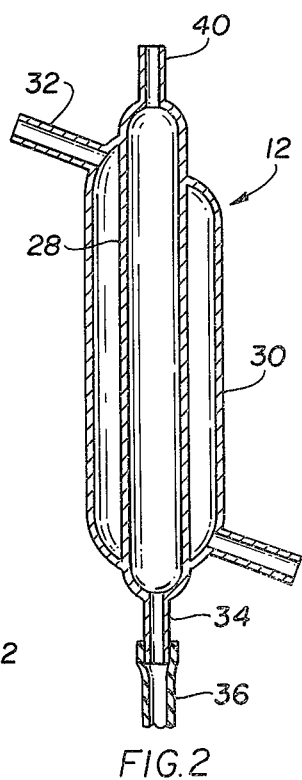
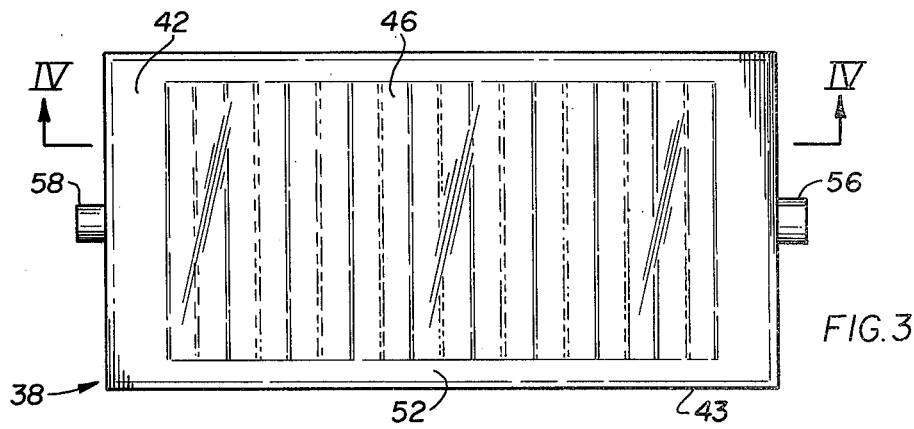
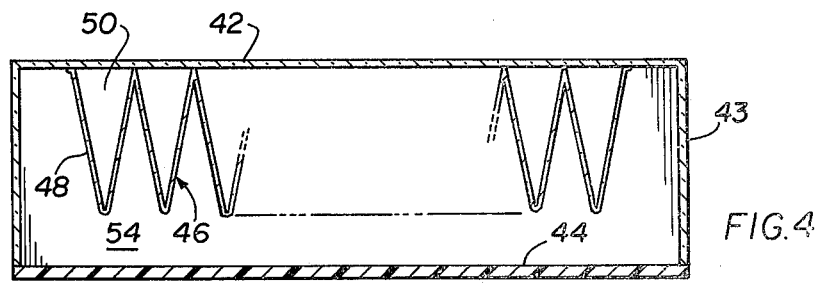

SOLAR COLLECTOR PANEL AND REFRIGERATION SYSTEM OPERATED THEREBY

This invention relates to the collection and utilization of solar energy, and particularly to an arrangement for collecting solar energy and to a refrigeration system operated by the collected solar energy.

The collector panels of known solar heating systems are costly and heavy. They need to be installed permanently by skilled craftsmen. In the northern and central United States, they are relatively ineffective in winter, and they are not readily converted for domestic refrigeration service in summer.

A primary object of the invention is an arrangement for collecting solar energy which is simple and inexpensive, also light enough in weight to be installed and removed by an ordinary homeowner without changes in the structure of the home during the transitional periods in spring and fall when adequate sunshine is available, and the air temperature is low enough to make heating desirable from time to time.

An equally important object is the provision of an inexpensive source of energy for a refrigeration system.

With these and other objects in view, the invention provides a plate-shaped panel including two wall members having each an annular edge portion sealed to the edge portion of the other wall members. One of the wall members is permeable to solar radiation, while the other is substantially opaque to such radiation. A radiation trap in the panel cavity includes several pairs of trap elements of sheet material fastened to the transparent wall member and permeable to solar radiation. The trap elements of each pair are joined spacedly adjacent the opaque wall member and diverge at a small, acute angle toward the transparent wall member. A circulating device introduces a fluid, such as air, into one part of the panel cavity, and the fluid is discharged from another, remote part of the cavity. A conduit for flow of the fluid between the two parts is defined between the trap element and the opaque panel wall.

The heated fluid discharged from the panel when the panel is exposed to solar radiation may be employed for supplying energy to a refrigeration unit, such as the generator of an absorption refrigeration system of the known type in which a generator capable of enclosing a refrigerant-laden absorbent is connected to a condenser receives refrigerant desorbed in the gaseous state from an absorbent in the generator by thermal energy supplied to the generator. The condenser is cooled for liquefying the desorbed, gaseous refrigerant. An evaporator connected to the condenser receives the liquefied refrigerant which withdraws thermal energy by heat transfer from material to be refrigerated and is volatilized by the thermal energy. The volatilized refrigerant is returned to the generator and again absorbed by the absorbent, the cycle being repeated continuously or intermittently.

Several types of air-cooled and water-cooled absorption refrigeration systems requiring only a heater and no mechanical energy are known. Each of them may be operated solely by hot air or another hot fluid discharged from the afore-described panel if the fluid is led through a tubular element of heat conducting material whose inlet is connected to the circulating device of the panel, and which is mounted on the generator of the refrigeration system in thermal contact with the absorbent in the same.

Other features and many of the attendant advantages of this invention will readily be appreciated as the same becomes better understood by reference to the following detailed description of preferred embodiments when considered in connection with the appended drawing in which:

FIG. 1 is a flow sheet of a refrigeration plant of the invention;

FIG. 2 shows the generator and associated elements of the plant of FIG. 1 in elevational section;

FIG. 3 shows a solar collector panel in the plant of FIG. 1 in top plan view; and FIG. 4 illustrates the panel of FIG. 2 in section on the line III — III.

Referring now to the drawing in detail, and initially to FIG. 1, there is shown a conventional absorption refrigeration system 10 which is of the Electrolux type believed to have been disclosed first in U.S. Pat. No. 1,609,334 (1926) to Von Platen et al. The system includes a generator 12 equipped with a heater 14 and connected to a condenser 16 which has a cooling jacket 18. The condenser communicates with an evaporator 20 provided with heat transfer coils 22 from which a return conduit 24 leads back to the generator. As is known in itself, the generator 12 contains water 26 in which ammonia is absorbed. When heated, the water releases the ammonia, and the desorbed ammonia vapors are liquefied in the condenser 16 by cooling water in the jacket 18. The liquefied ammonia flows into the evaporator 20 and is evaporated in the coils 22 by the thermal energy of the surrounding air or other material which it is intended to refrigerate. The ammonia vapors are returned to the generator for reabsorption in the water 26. The Electrolux refrigeration system is too well known to require more detailed description.

The generator 12 and associated elements are partly illustrated in FIG. 2. The generator, conventional in itself, includes an upright tubular heating element 28 surrounded by a jacket 30, commonly referred to as a percolating tube. Water carrying ammonia as an absorbed refrigerant is fed to the bottom of the percolating tube 30. Its temperature is raised by a hot gas in the element 28 so that bubbles of gaseous ammonia are formed. The hydrostatic pressure of water in a non-illustrated vessel communicating with the bottom of the percolating tube causes the lighter mixture of water and gaseous ammonia to rise in the percolating tube 30. The water and ammonia of the mixture overflowing from the top of the percolating tube through a pipe 32 are separated and are returned to the bottom of the percolating tube 30 in separate paths of which one was described briefly above.

In the known Electrolux refrigeration system, the heating gas is produced by a flame in the bottom end of the heating element 28. In the modified refrigeration system of the invention shown in FIG. 1, hot air is supplied to a bottom inlet 34 of the element 28 by a hose 36 from a solar collector panel 38. The air, partly cooled by the contents of the percolating tube 30 through the heat conductive metal wall of the element 28, is vented to the atmosphere outside the refrigerated space through an outlet pipe 40.

The solar collector panel 38, better seen in FIGS. 3 and 4, is a flat, hollow structure almost entirely consisting of plasticized polyvinyl chloride (PVC) sheet material. The rectangular top wall 42 and the narrow side walls 43 of the panel consists of a clear PVC sheet. The bottom wall 44 consists of black (carbon-filled) PVC.

An accordion-pleated sheet 46 of clear PVC is mounted in the panel cavity. It is divided into pairs of rectangular, elongated elements 48 by parallel creases alternatingly sealed to the top wall 42 and spacedly adjacent the bottom wall 44. Each pair of elements 48 diverging at a small acute angle from a crease near the bottom wall 44 and an associated portion of the top wall 42 thus bound a chamber 50 having the shape of a triangular prism. A narrow gap 52 separates the elements 48 from each of the transverse side walls 43 of the panel 38 so that the chambers 50 communicate with a conduit 54 bounded by the bottom wall 44 and the sheet 46. Nipples 56, 58 on two opposite side walls 43 communicate with the conduit 54 in such a manner that air introduced into the panel cavity through the inlet nipple 56 by a small circulating blower 60 flows through the conduit 54 in a path approximately perpendicular to the creases in the sheet 46. The blower intake is open to the atmosphere and the speed of the electric blower motor 62 is selected high enough that the outlet nipple 58 throttles discharge of the air to keep the panel inflated.

When the radiation-permeable top wall 42 of the panel 38 is exposed to sunlight, much of the solar radiation is absorbed by the bottom wall 44 and transmitted as thermal energy to the layer of air confined next to the bottom wall by the sheet 46. Radiation reflected or otherwise emitted by the bottom wall is trapped by the elements 48 and ultimately absorbed by the thin and wide stream of air in the conduit 54. The air in the chambers 50 is practically stagnant. The air flowing in the conduit 54 keeps the temperature of all plastic panel walls well below the softening temperature of the polyvinyl chloride.

The panel 38 may be placed in a shallow tray of wood or other conveniently available rigid material resistant to the operating temperature of the bottom wall. When the panel is operated to heat air, its weight is sufficiently small to be supported on thin plywood. A sturdier support may be needed when the apparatus uses water as the heating medium in the element 28 in the refrigeration system, and the water discharged from the heating element 28 is preferably returned to the circulating pump employed instead of the blower 60 in the modified arrangement.

The Electrolux system is but one of several known devices for cooling air or other materials by an absorption cycle, and other refrigeration systems, employing different absorbents, liquid or solid, and different refrigerants may be substituted in the apparatus of FIG. 1. It is known, for example, from U.S. Pat. No. 4,007,776 to employ a flat plate solar collector as a source of energy for a refrigeration system relying on compression and expansion of a gaseous refrigerant. The panel 38 may be used to advantage in this or any other refrigeration cycle not relying on absorption and desorption of a refrigerant.

The panel of the invention, when not used to drive a refrigeration unit may be employed to feed warm air into a house through the hose 36 when the latter is disconnected from the heating element 28. When weather conditions are such as not to require heating nor cooling, the deflated panel 38 may be rolled up and stored in a small space. Its installation requires no tools, no special skills, and only minimal effort. The connected refrigeration unit may cool a storage box, an icecream machine, or a room in a house in an obvious manner.

It should be understood, therefore, that the foregoing disclosure relates only to a presently preferred embodiment and that it is intended to cover all changes and modifications of the example of the invention herein chosen for the purpose of the disclosure which do not constitute departures from the spirit and scope of the invention set forth in the appended claims.

What is claimed is:

1. An arrangement for collecting solar energy comprising:
   (a) a plate-shaped panel including two wall members bounding a cavity in said panel,
      (1) said wall members having each an annular edge portion sealed to the edge portion of the other wall member,
      (2) one of said wall members being permeable to solar radiation, the other wall member being substantially opaque to said radiation;
   (b) a radiation trap in said cavity,
      (1) said trap including a plurality of pairs of trap elements of sheet material fastened to said one wall member and permeable to said radiation,
      (2) the trap elements of each pair being joined spacedly adjacent said other wall member and diverging toward said one wall member at an acute angle; and
   (c) circulating means for introducing a fluid into one part of said cavity and for withdrawing the introduced fluid from another part of said cavity remote from said one part,
      (1) said trap elements and said other wall member defining therebetween a conduit for flow of said fluid between said portions.

2. An arrangement as set forth in claim 1, wherein said trap elements are substantially planar, one trap element of each pair being continuously juxtaposed adjacent said one wall member to a trap element of another pair, said trap elements being elongated in a common direction transverse to the direction of said flow.

3. An arrangement as set forth in claim 1, wherein said wall members and said trap elements essentially consist of pliable material, and said circulating means include throttling means throttling discharge of said fluid from said other part of the cavity and for thereby expanding said panel under the pressure of the fluid introduced into said one part.

4. An arrangement as set forth in claim 1, wherein each of said pairs and said one wall member define therebetween a chamber communicating with said conduit and elongated transversely to the direction of said flow in said conduit, the width of said conduit in the direction of elongation of said chambers being greater than the thickness of said conduit transverse to said directions of flow and of elongation.

5. An arrangement as set forth in claim 1, wherein said circulating means include a fan.

6. A refrigeration plant comprising a thermally energized refrigeration unit, a collecting arrangement as set forth in claim 1, and connecting means connecting said other part of said cavity to said unit for flow of said fluid to said unit as a source of thermal energy.

7. A plant as set forth in claim 6, wherein said unit includes a generator capable of enclosing an absorbent and a refrigerant absorbed in said absorbent; a tubular element of heat conducting material mounted on said generator for thermal contact with absorbent enclosed in said generator, said element having an inlet and an outlet, said connecting means connecting said inlet to said other part of said cavity, whereby refrigerant absorbed by said absorbent may be thermally desorbed in the gaseous state by the thermal energy of the fluid withdrawn from said cavity; a condenser connected to said generator for receiving the desorbed refrigerant; cooling means operatively connected to said condenser for liquefying the gaseous refrigerant in said condenser; an evaporator connected to said condenser for receiving the liquefied refrigerant; said evaporator including heat transfer means for transmitting thermal energy from material to be refrigerated to the liquefied refrigerant in said evaporator and for thereby evaporating said refrigerant; and a return conduit connecting said evaporator to said generator for absorption of the evaporated refrigerant by said absorbent.

8. An arrangement as set forth in claim 1, wherein said one wall member consists essentially of optically clear synthetic resin composition.

9. An arrangement as set forth in claim 8, wherein said trap elements consist essentially of optically clear synthetic resin composition.

* * * * *